Patented Mar. 22, 1938

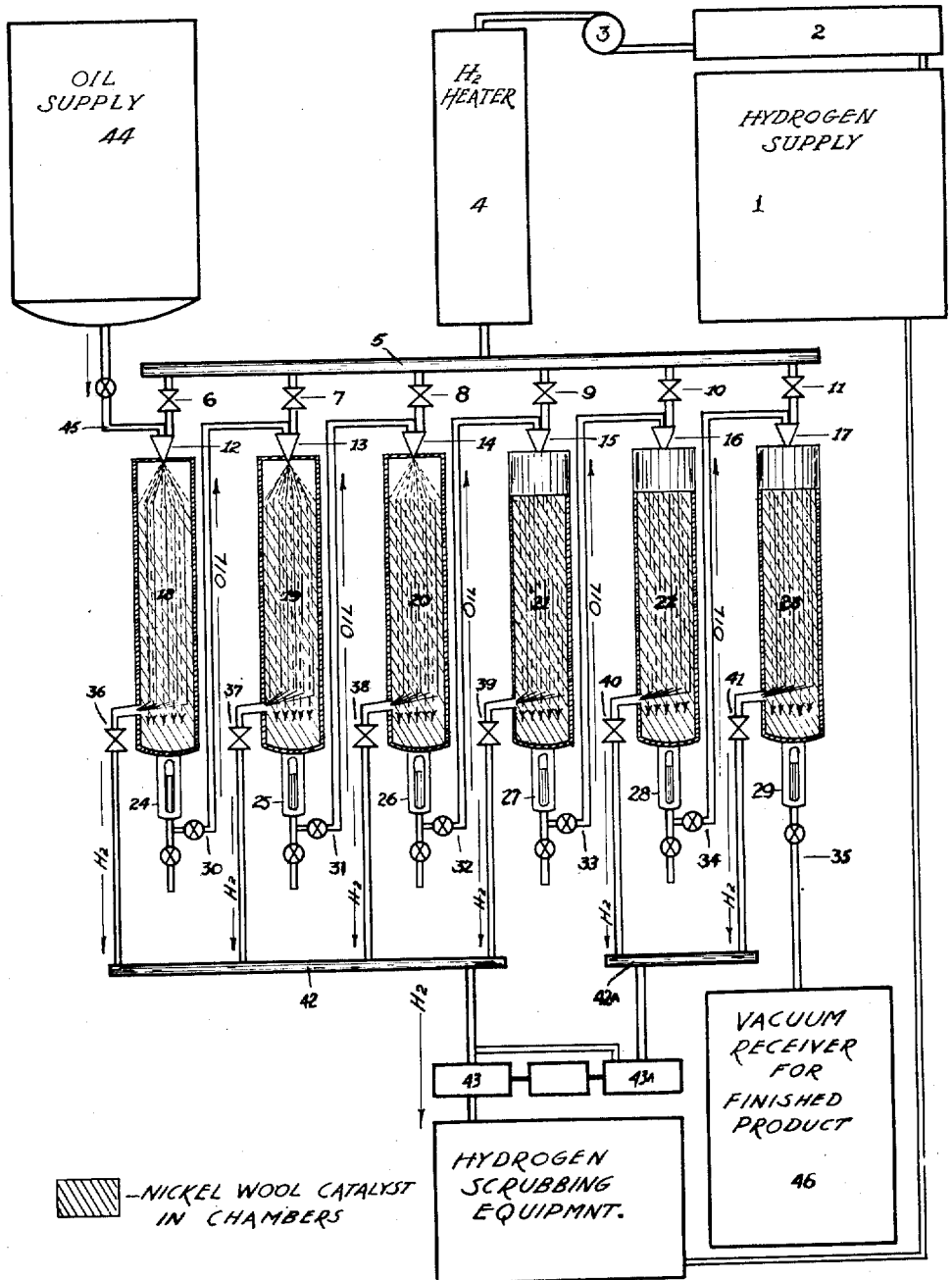

2,111,573

UNITED STATES PATENT OFFICE 2,111,573

PROCESS FOR THE CONTINUOUS SELECTIVE HYDROGENATION OF OIL AND REMOVAL OF BY-PRODUCTS

Moreland W. Schuman, Los Angeles, Calif.

Application December 15, 1934, Serial No. 757,625

11 Claims. (Cl. 87—12)

This invention relates to the processing and improvement of fatty acid ester type oils in general and to the improvement of edible vitamin potent fish oils in particular, the products of the latter being essentially free of the original fish oil flavor and odor, with or without an incorporated flavoring or other mechanically added substance, while retaining the vitamin value and other therapeutic properties of the fish oil.

Most fish liver oils and many fish body oils are potent of vitamins A and D, while certain fish liver oils, such as cod, constitute commercial and medicinal media of supplying these vitamins. These oils are rather unpleasant tasting and disturbing by way of causing either nauseation or aftertaste. For that reason they have been worked up into many different forms to improve palatableness. Owing to the sensitive character of the vitamins and their destruction in the ordinary methods of refining a fish oil of its flavor and odor, these products mostly aim at modifying the unpleasant taste by combination with flavoring material or other substance. Such products do not generally overcome olfactory or kindred disturbance and do not prevent the return of the fish oil taste from the stomach.

It is the purpose of this invention to make possible the utilization of A and D vitamin active fish oils for food as well as medicine. When processed by methods herein set forth such oils become, with their physiologically active fat soluble vitamins, valuable health food, and thereafter the term "medicinal" when applied to them would designate oils of sufficient vitamin concentration to meet the U. S. Pharmacopœia standard for medicinal cod liver oil, to-wit: 600 units (U. S. P. 1934) of vitamin A and 85 units (U. S. P. 1934) of vitamin D, per gram of oil.

The first objective, therefore, is the processing and improvement of edible vitamin potent fish oils in such manner as to dispose of properties which cause the fish taste, and at the same time preserve and retain active therapeutic principles. Since the most highly unsaturated fatty acids of fish oil originate the fish odor, these constituents must be eliminated and such elimination is most readily accomplished by conversion to a slightly more saturated state with hydrogen. Such partial hydrogenation must be highly selective for the fat soluble vitamins are likewise very unsaturated properties although, fortunately, they present greater resistance to the chemical addition of hydrogen under certain conditions.

But in the hydrogenation of normal fatty acid certain by-products are formed which, if permitted to contaminate the oil, give it a most objectionable flavor, an undesirable odor and a degree of toxicity. The existing art of hydrogenating fatty acid oils does not prevent this contamination but seeks to cure the evil by subsequent distillation or "deodorization" as it is called. This distillation procedure, to be effective, involves such time, high temperature and high vacuum as to destroy certain of the fat soluble vitamin activity to lose vitamin and chloresterol by volatilization of fatty acid glyceride. Two objectives of my process or procedure, therefore, are, such conditions and technique as to selectively and partially hydrogenate highly unsaturated fatty acid glyceride without hydrogenating the highly unsaturated vitamin; and such conditions and technique as not to contaminate the oil with objectionable hydrogenation by-products.

Another object is the processing and improvement of fatty acid ester type oils generally, by way of hydrogenation, the process offering advantages in reduction both of the temperature and the time of high temperature to which the oil must be subjected to produce edible and certain technical products. Very slight or partial hydrogenations, such as for bleaching purposes, or selective-partial hydrogenations as for essence conversion as described herein, operations wherein normal fatty acid is converted although to but a slight degree, are made economically practicable by the fact that the product is automatically freed of hydrogenation by-product, thus eliminating a second costly operation to deodorize.

I wash the vitamin potent fish oil with hydrogen, through stationary catalyst, after the manner of continuous process hydrogenation practice. I employ metal base catalyst, preferably, of which the common form is activated nickel wool. Reference is hereby made to the detailed description of catalyst and its preparation, and general methods of present day improved continuous process hydrogenation, by E. I. Lush, in the Industrial Chemist, 1927, 3, 249. Quoting therefrom: "The catalyst consists of pure nickel in the form of turnings or wire, the surface of which is first oxidized and then reduced back to nickel by hydrogen. This form of catalyst avoids the use of an inert support." In adaptation of continuous process hydrogenation, my washing process is continuous and in conjunction with the hydrogenation. In explanation of the process, for the sake of simplicity, I shall describe a stub or laboratory operation involving but one pressure chamber, and, as peculiar to the process, a vacuum chamber; and it is understood that the principle of my operation applies to a multiplicity of chambers when, for the sake of volume and continuity of operation they become necessary.

The vitamin potent fish oil, vacuumed of oxygen, is fed to the pressure chamber of the processing apparatus, preferably by hydrogen pressure, after all piping feeding thereto or out from and all containers in the line or system have been exhausted of air, hydrogen has been entered therein and the catalyst prepared. I prefer to use electrolytically produced hydrogen, and I have found that in the improvement of vitamin active fish oils when conservation of vitamin is of paramount importance, temperatures should not exceed about 150 degrees C., but I employ much lower temperature in the pressure chamber or chambers, particularly when catalyst is active. Immediately upon emerging from the pressure chamber the oil is again washed with hot odorless hydrogen, but this time in a vacuum chamber at a temperature of about 150 degrees C.

In a washing operation, the objective being to improve the flavor and odor of the oil, the washing medium must naturally be clean, so that in my process odorless gas must be delivered to the chambers, and the supply stream will naturally divide and flow to each chamber while a single stream of oil flows in a continuous and consecutive manner, as in series, through the chambers of the apparatus, being sprayed therein by the gas as it enters each chamber and being washed by such manner of contact; I do not, however, exclude the use of oil pressure spraying or of additional washing method in conjunction with spraying, e. g., a counter-current flow of gas, or of such other effective manipulation as is known to the art. Thus in relation to the chambers of the apparatus the gas may be said to flow "in parallel", in contradistinction to flowing "in series"; however, this is not to say that the gas streams must necessarily, or literally, flow parallel to each other. I have shown that the gas does not follow through the apparatus as does the oil.

In the pressure chamber a washing or sweeping out of odor is accomplished along with the hydrogenation or conversion of the odorous principle of the oil. The object of the vacuum wash is not to further hydrogenate or convert, but is to sweep out remaining by-product or hydrogenation odor under more optimum conditions. A different washing medium may be employed for the vacuum chamber, if desired; such inert gases as steam or carbon dioxide are suitable. A catalyst is not required for this operation and would not be operative as such if present, although the metal base, i. e. the nickel turnings or wool, will operate mechanically as a means for recapturing the oil from the spray mist. From the vacuum chamber the oil emerges substantially free of catalytic by-product flavor, odor and toxicity. It is then quickly cooled to a temperature of 40 degrees C. or lower and stored under vacuum or otherwise protected against oxidation.

In continuous process hydrogenation, with stationary catalyst, only a comparatively small amount of oil is processed or being treated at any one time in a chamber,—only the amount of a section of the stream of oil flowing into and out of the chamber. The significance of my washing operation becomes clear by visualizing this section of a small stream of oil and checking against the comparatively enormous quantity that is being simultaneously treated in a batch hydrogenation. When the small quantity of flowing oil, finely comminuted by spray, impinges upon the stationary catalyst, most of the hydrogenation by-products which form are washed or swept out with the freely moving hydrogen and the oil drips to the bottom of the chamber to flow out substantially free of such by-products. While in a batch hydrogenation the mass of oil is continually being contaminated with hydrogenation by-products which have no freedom to escape with the surplus hydrogen except in a small degree at the upper surface of the oil body. The accomplishment of this second objective of my process may be still more clearly understood by following the diagram which illustrates one method of hydrogen washing. In this illustration a six chamber apparatus is described.

From the odorless hydrogen supply (1), hydrogen is conducted through heat exchanger (2) and compressor (3) to the heater (4) from which it is conducted to the hydrogen inlet manifold (5) where the stream is divided to flow through the pressure valve controlled branch lines (6), (7), (8), (9), (10) and (11), and the respective spray nozzles (12), (13), (14), (15), (16) and (17) to the respective reaction vessels (18), (19), (20), (21), (22) and (23). From the oil supply (44), oil is conducted via needle valve controlled line (45) to spray nozzle (12) of the first pressure chamber (18). One way of preheating the oil is to conduct it through a small chamber through which the hot hydrogen flows. Such a chamber is the spray nozzle (12) into which the hot hydrogen flows to meet the oil at a small opening in the reaction vessel (18). The oil is finely comminuted by the expansion of the hydrogen within the vessel, impinges on the nickel wool catalyst therein and absorbs hydrogen as it trickles through the catalyst to the bottom of the vessel and collects in the sight gauge oil receiver (24). (Hydrogen pressure before entering the reaction vessel is sufficiently higher than that within the chamber to cause a rapid expansion of the incoming hydrogen.) The surplus hydrogen flows freely to the hydrogen exit near the bottom of the chamber and is conducted through the pressure valve controlled line (36) to the outlet manifold (42), thence through the vacuum pump (43) and on to heat exchanging, dehydrating and deodorizing equipment, thence to be returned to the odorless hydrogen supply tank (1). The oil having collected in the receiver (24), prevents the hydrogen from using this exit and thereafter the oil is withdrawn at the same rate of flow as it enters the receiver and is conducted via the needle valve controlled oil line (30) to spray nozzle (13) at top of second pressure chamber (19) where it again meets hot odorless hydrogen upon entering the chamber and is again comminuted, impinges upon the nickel wool catalyst therein and trickles to bottom of chamber. In like manner the oil is conducted from sight gauge receiver (25) to and through pressure chambers (20) and (21) and to and through the vacuum chambers (22) and (23) and is withdrawn from (23) via needle valve controlled line (35) which carries it to the vacuum receiver for finished product (46). The pressure chambers (18), (19), (20) and (21) operate with progressively decreasing internal hydrogen pressure, which assists in delivering the oil from the bottom of one to the top of the next in the flow series, while a higher vacuum maintained in (23) than in (22) accomplishes a like purpose. Needle valve controlled taps at the bottom of each sight gauge oil receiver permit of sampling the product of any of the pressure chambers or of withdrawing product from any chamber. The hydrogen flow from chambers (19), (20), (21), (22) and (23) follows a course similar to that from chamber (18), that is, out via pressure controlled lines (37), (38), (39), (40) and (41) respectively and into manifold (42), except that gas from the vacuum chambers (22) and (23) is fed into manifold (42A), thence to vacuum pump (43A) which directs the stream of exhaust hydrogen to join with that from manifold (42) flowing into vacuum pump (43).

The time consumed in the combined preheating and passage of oil through the processing chambers will vary somewhat with different apparati and the method of "washing" the oil; the endeavor should be toward consuming a minimum of time and the period of high temperature should not exceed about 25 minutes; the volume and flow of oil must be attuned to the particular apparatus and method of washing. Without raising the congealing point of the oil more than a few degrees and without destroying the physiological activity of the vitamins, the conversion of essence is such as to render the fish oil unrecognizable by taste and odor, and the conversion of essence is complete in that the original flavor and odor does not return.

By washing the oil over sufficient active catalyst in the manner outlined, the selective-partial hydrogenation may be carried beyond that resulting in the initial conversion of essence. This may be done with the purpose of raising further the congealing point of the oil and although such treatment results in a progressive lowering of vitamin potency of the oil, it likewise constitutes essence conversion.

Continuous process hydrogenation as practised with stationary catalyst employs a wide range of temperature and pressure. In my process of "continuous hydrogenation and refining of hydrogenation by-product" the practical temperature range comprises about 100–200 degrees C. in the pressure chamber or chambers, with about 150–200 degrees C. in the vacuum chamber or chambers, while pressure conversely covers a range from 100 or more pounds down to atmospheric in the former and such vacuum as is found suitable for the particular operation in the latter. However, I do not intend these ranges as strict limitations of my process, since occasion might demand lower temperature and higher pressure; temperatures considerably below 100 degrees C. together with pressure of 200 to 300 or more pounds are conditions within the scope of the general process. In hydrogenating, the lower temperatures require the higher pressures and vice versa; active catalyst demands less temperature and less pressure than exhausted catalyst; and the vacuum chamber or chambers consistently require the higher temperatures in order to volatilize odorous and toxic by-product.

I have found that it is possible, by my hydrogen washing essence conversion process, to convert selectively and partially normal fatty acid of cod liver oil and obtain without further processing a palatable product with a buttery flavor, and that an equivalent product cannot be obtained by the ordinary hydrogenation followed with batch deodorization, since the objectionable by-products of hydrogenating normal fatty acid cannot be eliminated by batch deodorization under temperature, time and vacuum conditions which will at the same time not destroy or carry over vitamin A; that I can convert at temperatures in the neighborhood of 100 degrees C. the glycerides of highly unsaturated acids, such as acids of four and more double bonds (commonly called clupanadonic acid (substantially to three double bond structure while the remaining glycerides of normal fatty acid, the cholesterol and the vitamin are substantially unaltered and uncontaminated with hydrogenation by-product such as aldehyde and certain objectionable saturated fatty acid of low carbon content.

By such character of mild treatment, as distinguished by strict care against oxidation of the vitamin, by restricted catalytic action amounting to a gentle selective-partial hydrogenation, combined with the washing effect of odorless hydrogen, first at pressure above atmospheric, and then at a reduced pressure below atmospheric, and by restricting the period of moderate high temperature to less than 25 minutes (accomplished by dovetailing the hydrogenation and refining procedure so that the two progress together) the A as well as the D vitamin activity is conserved while the fish oil flavor and odor is converted to an inoffensive mild essence somewhat resembling that of filtered butter oil.

The process as relating to the improvement of flavor and odor of fish oil is designated "essence conversion", and oil so treated as having been "convertessed". In its broader significance, the process is a continuous method of "combined hydrogenation and refining of hydrogenation by-product" applicable to ester type fatty acid oils, in which an operation of "continuous hydrogenation" and an operation of "continuous refining" are combined together into one operation. This one operation may be described as a "washing"—with an inert gas medium—plus a hydrogenation in its first part.

The essence conversion process is not an attempt to bland the oil, nor to cover up the objectionable fish oil odor by the addition of other essence or substance, but consists in actually converting the fish oil flavor and odor so as to give a mild, pleasing and entirely different taste, somewhat resembling that of filtered sweet butter oil, in which condition the adding of a popular essence or the emulsification of the oil with any of the numerous materials available gives additional character to an otherwise palatable and attractive product. Under the present invention, medicinal and vitamin grade fish oil is made more palatable, appetizing and more useful by being essentially freed of the original flavor and odor, all without destroying the physiological activity of the vitamins.

Intensification of the treatment of vitamin active fish oils, as previously described, resulting in a product of a higher congealing point, would presumably be practised in order to obtain a product which would congeal upon chilling, and yet which would contain as much vitamin activity as could be conserved considering the degree of melting point to which the oil is raised. Different batches of raw oil vary in vitamin potency so that products processed from them will vary accordingly and also as to the degree of melting point to which they are processed. A distinct advantage is obtained for vitamin conservation in the partial hydrogenation of vitamin active fish oils by the herein described process. This is especially noticeable in partially hardening up to as high as 25 degrees C. melting point. The hardened products of the commercial hydrogenation industry range in melting point from about 30 degrees C. up, and the uncompounded products of essence conversion may be said to embrace the field of melting points below 30 degrees C., so that the processed oil by itself is always fluid at normal room temperatures.

With the oil converted in essence, any essential oil, acid or alcohol of edible grade, or a glyceride of an acid, may be blended or emulsified therewith to suit the taste. A proportion of refined oil or fat such as cocoanut or palm oil may be compounded therewith. The compounding may be done before treatment with hydrogen, and the compound treated. Two or more vitamin active fish oils such as cod, halibut or tuna liver oil, salmon body or liver oil, sardine oil, or oils of other species of fish may be blended for particular quality and/or color; some oils are highly potent of vitamin A and low of D, while others are more highly potent of vitamin D; salmon oil is particularly distinctive in the matter of color and valuable for its coloring property.

By compounding after treatment any hardened edible oil of high melting point may be used to produce a compound of high melting point, which is susceptible of processing into other products requiring a higher melting point than can be attained by vitamin conserving hydrogen treatment of fish oil; or a fish oil may be "wintered" after treatment rather than before. Such further processed products as "table oil", "margarine" and "variously medicated" oil, of vitamin active fish oil stock, are objectives within the scope of this invention.

This application is a continuation in part of my earlier application Serial Number 414,575, filed December 16, 1929.

Having now described my invention, what I claim and desire to secure by Letters Patent is:—

1. The process of continuous and selective hydrogenation and removal of hydrogenation by-products of fatty acid ester type oils which includes flowing a stream of hydrogen bearing gas and oil in the same direction through a hydrogenating chamber maintained at a temperature of about 100–150° C. containing a stationary metallic catalyst in such a manner as to wash out the hydrogenation by-products formed while hydrogenating the oil and under a gas pressure above atmospheric, and thereafter washing the oil in small cross section size with an inert gas under sub-atmospheric pressure at a temperature of about 150–200° C., the entire operation being consummated in a period of time which will not destroy the physiological activity of the vitamin content thereof.

2. The process as claimed in claim 1 wherein the hydrogenation and removal of hydrogenation by-products is accomplished in approximately 25 minutes.

3. The process as claimed in claim 1 wherein the oils are introduced into the hydrogenation chamber in the form of a spray.

4. The process as claimed in claim 1 wherein the inert gas is hydrogen.

5. A process for the continuous selective hydrogenation and removal of hydrogenation by-products of fatty acid ester type oil which includes flowing streams of the said oil and a hydrogen bearing gas through a reaction chamber containing stationary metallic catalysts at a super-atmospheric pressure to hydrogenate the said oil and wash out hydrogenation by-products therefrom, the hydrogenation chamber being maintained at a temperature of about 100°–150° C., and continuing the washing of said hydrogenated oil while in small cross section size at a temperature of about 150°–200° C. and at a sub-atmospheric pressure with an inert gas, the entire operation being consummated within a period of approximately 25 minutes.

6. The process as claimed in claim 5 wherein the fatty acid ester type oil is initially sprayed into the reaction chamber.

7. The process as claimed in claim 5 wherein the inert gas is hydrogen.

8. A process for the continuous selective partial hydrogenation and removal of hydrogenation by-products of vitamin potent fish oil which includes feeding the oil, together with a hydrogen bearing gas under super-atmospheric pressure into a hydrogenation chamber containing a catalyst, continuing the said treatment of said oil in at least one additional chamber at progressively decreasing gas pressures, the said chambers being maintained at a temperature of about 100° C., and thereafter circulating the partially hydrogenated oil together with an inert gas through one or more washing chambers wherein the oil is put in a size of small cross sectional area maintained at a temperature of about 150° C. and under a progressively increasing vacuum, the entire operation being consummated in a period of time which will not destroy the physiological activity of the vitamin content thereof.

9. The process as claimed in claim 8 wherein the vitamin potent fish oil is initially sprayed into the hydrogenation chamber.

10. The process as claimed in claim 8 wherein the partial hydrogenation and removal of hydrogenation by-products of the vitamin potent fish oil is accomplished in approximately 25 minutes.

11. The process as claimed in claim 8 wherein the inert gas is hydrogen.

MORELAND WM. SCHUMAN.

---

CERTIFICATE OF CORRECTION.

Patent No. 2,111,573.   March 22, 1938.

MORELAND W. SCHUMAN.

It is hereby certified that error appears in the printed specification of the above numbered patent requiring correction as follows: Page 1, second column, line 11, after the word "volatilization" insert and to cause polymerization; and that the said Letters Patent should be read with this correction therein that the same may conform to the record of the case in the Patent Office.

Signed and sealed this 16th day of April, A. D. 1940.

(Seal)

Leslie Frazer
Acting Commissioner of Patents.

ing point from about 30 degrees C. up, and the uncompounded products of essence conversion may be said to embrace the field of melting points below 30 degrees C., so that the processed oil by itself is always fluid at normal room temperatures.

With the oil converted in essence, any essential oil, acid or alcohol of edible grade, or a glyceride of an acid, may be blended or emulsified therewith to suit the taste. A proportion of refined oil or fat such as cocoanut or palm oil may be compounded therewith. The compounding may be done before treatment with hydrogen, and the compound treated. Two or more vitamin active fish oils such as cod, halibut or tuna liver oil, salmon body or liver oil, sardine oil, or oils of other species of fish may be blended for particular quality and/or color; some oils are highly potent of vitamin A and low of D, while others are more highly potent of vitamin D; salmon oil is particularly distinctive in the matter of color and valuable for its coloring property.

By compounding after treatment any hardened edible oil of high melting point may be used to produce a compound of high melting point, which is susceptible of processing into other products requiring a higher melting point than can be attained by vitamin conserving hydrogen treatment of fish oil; or a fish oil may be "wintered" after treatment rather than before. Such further processed products as "table oil", "margarine" and "variously medicated" oil, of vitamin active fish oil stock, are objectives within the scope of this invention.

This application is a continuation in part of my earlier application Serial Number 414,575, filed December 16, 1929.

Having now described my invention, what I claim and desire to secure by Letters Patent is:—

1. The process of continuous and selective hydrogenation and removal of hydrogenation by-products of fatty acid ester type oils which includes flowing a stream of hydrogen bearing gas and oil in the same direction through a hydrogenating chamber maintained at a temperature of about 100–150° C. containing a stationary metallic catalyst in such a manner as to wash out the hydrogenation by-products formed while hydrogenating the oil and under a gas pressure above atmospheric, and thereafter washing the oil in small cross section size with an inert gas under sub-atmospheric pressure at a temperature of about 150–200° C., the entire operation being consummated in a period of time which will not destroy the physiological activity of the vitamin content thereof.

2. The process as claimed in claim 1 wherein the hydrogenation and removal of hydrogenation by-products is accomplished in approximately 25 minutes.

3. The process as claimed in claim 1 wherein the oils are introduced into the hydrogenation chamber in the form of a spray.

4. The process as claimed in claim 1 wherein the inert gas is hydrogen.

5. A process for the continuous selective hydrogenation and removal of hydrogenation by-products of fatty acid ester type oil which includes flowing streams of the said oil and a hydrogen bearing gas through a reaction chamber containing stationary metallic catalysts at a super-atmospheric pressure to hydrogenate the said oil and wash out hydrogenation by-products therefrom, the hydrogenation chamber being maintained at a temperature of about 100°–150° C., and continuing the washing of said hydrogenated oil while in small cross section size at a temperature of about 150°–200° C. and at a sub-atmospheric pressure with an inert gas, the entire operation being consummated within a period of approximately 25 minutes.

6. The process as claimed in claim 5 wherein the fatty acid ester type oil is initially sprayed into the reaction chamber.

7. The process as claimed in claim 5 wherein the inert gas is hydrogen.

8. A process for the continuous selective partial hydrogenation and removal of hydrogenation by-products of vitamin potent fish oil which includes feeding the oil, together with a hydrogen bearing gas under super-atmospheric pressure into a hydrogenation chamber containing a catalyst, continuing the said treatment of said oil in at least one additional chamber at progressively decreasing gas pressures, the said chambers being maintained at a temperature of about 100° C., and thereafter circulating the partially hydrogenated oil together with an inert gas through one or more washing chambers wherein the oil is put in a size of small cross sectional area maintained at a temperature of about 150° C. and under a progressively increasing vacuum, the entire operation being consummated in a period of time which will not destroy the physiological activity of the vitamin content thereof.

9. The process as claimed in claim 8 wherein the vitamin potent fish oil is initially sprayed into the hydrogenation chamber.

10. The process as claimed in claim 8 wherein the partial hydrogenation and removal of hydrogenation by-products of the vitamin potent fish oil is accomplished in approximately 25 minutes.

11. The process as claimed in claim 8 wherein the inert gas is hydrogen.

MORELAND WM. SCHUMAN.

---

CERTIFICATE OF CORRECTION.

Patent No. 2,111,573.    March 22, 1938.

MORELAND W. SCHUMAN.

It is hereby certified that error appears in the printed specification of the above numbered patent requiring correction as follows: Page 1, second column, line 11, after the word "volatilization" insert and to cause polymerization; and that the said Letters Patent should be read with this correction therein that the same may conform to the record of the case in the Patent Office.

Signed and sealed this 16th day of April, A. D. 1940.

(Seal)

Leslie Frazer
Acting Commissioner of Patents.

CERTIFICATE OF CORRECTION.

Patent No. 2,111,573. March 22, 1938.

MORELAND W. SCHUMAN.

It is hereby certified that error appears in the printed specification of the above numbered patent requiring correction as follows: Page 1, second column, line 11, after the word "volatilization" insert and to cause polymerization; and that the said Letters Patent should be read with this correction therein that the same may conform to the record of the case in the Patent Office.

Signed and sealed this 16th day of April, A. D. 1940.

(Seal)

Leslie Frazer
Acting Commissioner of Patents.